(12) United States Patent
Fechner et al.

(10) Patent No.: US 7,700,506 B2
(45) Date of Patent: *Apr. 20, 2010

(54) UV-RADIATION ABSORBING GLASS WITH REDUCED ABSORPTION OF VISIBLE LIGHT AND METHOD OF MAKING AND USING SAME

(75) Inventors: Joerg Fechner, Mainz (DE); Andreas Reisse, Weiden (DE); Franz Ott, Mitterteich (DE); Brigitte Hueber, Weiden (DE)

(73) Assignee: Schott AG, Mainz (DE)

( * ) Notice: Subject to any disclaimer, the term of this patent is extended or adjusted under 35 U.S.C. 154(b) by 0 days.

This patent is subject to a terminal disclaimer.

(21) Appl. No.: 12/099,383

(22) Filed: Apr. 8, 2008

(65) Prior Publication Data

US 2008/0254301 A1 Oct. 16, 2008

Related U.S. Application Data

(63) Continuation of application No. 10/861,822, filed on Jun. 4, 2004, now Pat. No. 7,375,043.

(30) Foreign Application Priority Data

Jun. 6, 2003 (DE) ............................... 103 25 744

(51) Int. Cl.
*C03C 3/091* (2006.01)
*C03C 3/093* (2006.01)

(52) U.S. Cl. ............................. 501/65; 501/66; 501/67; 65/134.3

(58) Field of Classification Search ................... 501/65, 501/66, 67, 68, 69, 70, 72; 65/145.3
See application file for complete search history.

(56) References Cited

U.S. PATENT DOCUMENTS 4,298,389 A  11/1981  Johnson et al.
4,565,791 A   1/1986  Boudot et al.

FOREIGN PATENT DOCUMENTS

JP  55-109243   8/1980
JP  57-166334  10/1982
JP  60-161351   8/1985

OTHER PUBLICATIONS

Technology of Glass, edited by Northwest Institute of Light Industry, published by China Light Industry Press, (Jan. 1982) pp. 503-508, 198, 199, 203-206, 234, 235.*

* cited by examiner

*Primary Examiner*—David M Brunsman
(74) *Attorney, Agent, or Firm*—Michael J. Stricker (57) ABSTRACT

The PbO-free UV-absorbing glass is made under oxidative conditions and has a composition, in % by weight, of: $SiO_2$, 55-79; $B_2O_3$, 3-25; $Al_2O_3$, 0-10; $Li_2O$, 0-10; $Na_2O$, 0-10; $K_2O$, 0-10; MgO, 0-2; CaO, 0-3; SrO, 0-3; BaO, 0-3; ZnO, 0-3; $ZrO_2$, 0-3; $CeO_2$, 0-1; $Fe_2O_3$, 0-1; $WO_3$, 0-3; $Bi_2O_3$, 0-3; $MoO_3$, 0-3; $\Sigma Li_2O+Na_2O+K_2O$=0.5 to 16 and $\Sigma MgO+CaO+SrO+BaO+ZnO$=0-10. It also contains from 0.1 to 10% $TiO_2$ with at least 95% of the titanium as $Ti^{+4}$ so that it has a high visible transmission, reduced color centers, and a sharp UV absorption edge. It is especially useful in lamps, display devices and glass-to-metal seals

20 Claims, 8 Drawing Sheets

UV-RADIATION ABSORBING GLASS WITH REDUCED ABSORPTION OF VISIBLE LIGHT AND METHOD OF MAKING AND USING SAME

CROSS-REFERENCE

This is a continuation of U.S. patent application Ser. No. 10/861,822, which was filed on Jun. 4, 2004 now U.S. Pat. No. 7,375,043 in the U.S. Patent and Trademark Office.

BACKGROUND OF THE INVENTION

1. Field of the Invention

The present invention concerns a method of manufacturing UV-radiation absorbing glass, which has only reduced absorption in the visible range, and to the glass made by this method as well as to its use.

2. Description of the Related Art

Glasses with strong UV-absorbing properties are already known. These glasses are used for making gas discharge tubes and especially fluorescence lights and for making liquid crystal displays (LCDs). Fluorescent lights are used as light sources, especially in back side illuminated displays (so-called back light displays). This type of fluorescent light has very small dimensions and the lamp glass accordingly has only an extremely small thickness. It has been shown that the absorption in the visible range under 1000 nm is considerable despite the reduced thickness. This is disadvantageous, especially in a high-grade display device, such as an electronic display unit, for example a computer screen for laptops, or also in mobile telephones.

Moreover the permeability and/or transmission of especially visible light up to wavelength ranges under 400 nm, especially under 380 nm, is kept comparatively constant in glasses for this sort of application and then drops steeply. Gas discharge lamps, especially fluorescent lamps, emit a large fraction of their radiation in the UV range, which has a damaging effect for surrounding components, such as polymers and other plastic materials. Thus they become brittle after a certain time, which can lead to them becoming unusable. The mercury emission line at 318 nm is especially damaging. It is thus a goal to prepare glass of this type, which completely absorbs this emission line.

Furthermore fluorescent lamp glasses are known from U.S. Pat. No. 5,747,399 A for the above-described applications, which absorb UV-radiation in the desired amounts. However it has been shown that this sort of glass exhibits a strong solarization and a strong discoloration in the visible range. Frequently a yellow-brown coloration arises when the raw material for these lamp glasses melts.

A zirconium-oxide-containing and lithium-oxide-containing borosilicate glass of high resistance is known from DE-A 198 42 942, which is especially suitable for use as sealing glass for sealing with Fe—Co—Ni alloys. This sort of glass can also contained colored ingredients, such as $Fe_2O_3$, $Cr_2O_3$, CoO and $TiO_2$.

In U.S. Pat. No. 4,565,791 A glass is described for opthalmologic applications, which has a special index of refraction and Abbé number, and a suitable density for that application. This sort of glass has a UV absorption limit or edge between 310 nm and 335 nm and contains $TiO_2$ as UV absorber. For manufacture of this glass this reference expressly teaches that refining with chlorine is required, since refining with $As_2O_3$ and with $Sb_2O_3$ is not sufficient. Finally the reference teaches that although these glasses are extremely thin, a combination of $Fe_2O_3$ and $TiO_2$ leads to a discoloration of the glass so that quartz raw material should be used exclusively with an iron content of less than 100 ppm.

SUMMARY OF THE INVENTION

It is an object of the present invention to provide glass, which does not have the above-described disadvantage and which effectively blocks UV radiation, however which has a high transmission in the visible range and which may be sealed with conventional alloys, such as Fe—Co—Ni alloy, e.g. a KOVAR® alloy, and with metals, such as tungsten and/or molybdenum.

It is another object of the present invention to provide a glass with as sharp as possible a UV-edge or limit, i.e. the transmission should rapidly drop to zero within a few nanometers. The less the spacing between maximum transmission and maximum absorption, the steeper and/or sharper is the absorption edge or limit.

These objects are attained by a glass defined in the claims appended below, and by the methods for making it and using it.

According to the invention the method of making a UV-absorbing glass, which transmits in a visible range, comprises melting raw materials to form a melt and producing the melt under oxidative conditions with the following composition:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-10% by weight |
| $K_2O$ | 0-10% by weight, |
| Wherein Σ $Li_2O$ + $Na_2O$ + $K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| Wherein Σ MgO + CaO + SrO + BaO + ZnO | 0-10% by weight, |
| $ZrO_2$ | 0-3% by weight |
| $CeO_2$ | 0-1% by weight |
| $Fe_2O_3$ | 0-1% by weight |
| $WO_3$ | 0-3% by weight |
| $Bi_2O_3$ | 0-3% by weight |
| $MoO_3$ | 0-3% by weight |
| $TiO_2$ | 0.1-10% by weight |
| $As_2O_3$ | 0.01-1% by weight. |

According to the invention it was found that the above-described disadvantages may be at least partially avoided when the glass melt is substantially free of chloride and especially no chloride and/or $Sb_2O_3$ is added for refining the glass melt. It was also found that a blue coloration of the glass, like that which occurs when $TiO_2$ is added, could be avoided, when chloride is not used as a refining agent.

Surprisingly it has also been shown that sulfate, like that e.g. a used as a refining agent, likewise leads to coloration of the glass, like the aforementioned agents. According to the invention sulfates are preferably avoided.

Finally the objects of the invention are attained and the above-described disadvantages avoided by refining with $As_2O_3$ and of course under oxidizing conditions, and especially when $TiO_2$ is added together with $Fe_2O_3$ to adjust the UV absorption edge or limit. According to the invention it was found that the above-described disadvantages may be avoided when at least 80%, preferably at least 90%, especially preferably at least 95% and most preferably at least 99% of the titanium in the $TiO_2$ in the glass or melt is in the +4 oxidation state. Especially preferably 99.9%, even more preferably 99.99%, of the titanium present is $Ti^{+4}$. In a few cases it has proven significant that 99.999% of the titanium present is present as $Ti^{+4}$. The term "oxidative conditions" means those conditions under which $Ti^{+4}$ is in the above-described amounts or is oxidized to it. These types of oxidation conditions may be easily achieved according to the invention in the melt, for example by addition of nitrates, especially alkali and/or alkaline earth nitrates and optionally zinc nitrates. An oxidative melt can be produced by blowing oxygen and/or dry air into it. Furthermore it is possible to produce an oxidative melt according to the method of the invention by means of an oxidizing burner adjustment, e.g. on melting the raw materials.

It has been shown that color-forming faults and defects formed by color-forming and solarization in the glass matrix are avoided or at least greatly reduced with the procedure according to the invention.

The glass according to the invention is made by making a melt from conventional starting materials including alkali oxides, such as Na, K and Li, which are added as the corresponding carbonates and preferably as the nitrates. The use of halides and/or sulfates is preferably avoided in the method according to the invention. The glass is melted in a known way from its raw materials and preferably refined by means of $As_2O_3$. However minimal traces of sulfate can be present in the melt and/or the raw material during oxidative refining as long as a content of 0.2 Mol % and especially 0.1 Mol % is not exceeded. The method according to the invention is preferably performed without $Sb_2O_3$ as refining agent and the glass is preferably free of it. The maximum content of alkali and/or alkaline earth oxides added as nitrate amounts to 8 percent by weight, preferably 6 percent by weight and especially preferably 2 percent by weight. However the minimum amount is at least 0.1% by weight and at least 0.5 percent by weight is preferred. The nitrate itself is used in an appropriate amount of at least 0.3 Mol % in the method according to the invention, preferably at least 1 Mol %. The usual maximum amount of nitrate is 6 Mol % and especially 5 Mol %.

The refining agent $As_2O_3$ is employed in the method according to the invention in an amount of at least 0.01 percent by weight, preferably at least 0.05 percent by weight and especially preferably at least 0.1% percent by weight. The usual maximum amount of $As_2O_3$ is 2 percent by weight, especially 1.5 percent by weight, and preferably 1 percent by weight. A maximum amount of 0.8 percent by weight is particularly preferred.

The content of $TiO_2$, by which the strength and sharpness and position of the UV absorption edge or limit is adjustable, amounts to preferably at least 0.05 percent by weight, usually at least 0.1 percent by weight. However at least 0.5% by weight is especially preferred. In most cases the minimum amount of 1 percent by weight, and/or 2 percent by weight, of $TiO_2$ has proven to be suitable for blocking up to at least 260 nm (layer thickness 0.2 mm). To obtain blocking at 320 nm (layer thickness 0.2 mm) amounts of at least 4 percent by weight of $TiO_2$, preferably at least 4.5 percent by weight, have proven to be sufficient. The usual maximum amount of $TiO_2$ for this wavelength range amounts to 6 percent by weight, preferably 5.5 percent by weight. The maximum amount of $TiO_2$ according to the invention is 12% by weight, usually 10% by weight, but 8% by weight is especially preferred.

According to the invention it has been found that $Fe_2O_3$ may be used to still further adjust the UV absorption edge or limit in a synergistic way. Although it is known that $Fe_2O_3$ leads to a discoloration of the base glass and thus to an undesirable absorption of visible wavelengths, it has now been found that the glass is not discolored in the visible range or at most in a non-interfering manner, when it, as already described, is oxidatively refined in the glass composition according to the invention. In this way it is now possible according to the invention to limit the $TiO_2$ content in the glass. It has also been shown that the $TiO_2$ dissolved in the base matrix separates into two phases, especially at higher titanium content during slow cooling and/or renewed heating, for example, in processing, especially at higher titanium concentration, which leads to a Tyndall effect, which scatters light. This effect and thus the inherent reduction of $TiO_2$ can now be avoided by addition of $Fe_2O_3$ to the base glass under oxidative conditions. The amount of $Fe_2O_3$ in the glass preferably amounts to at least 50 ppm, especially at least 100 ppm. A minimum content of 120 and/or 140 ppm is preferred. However typical minimum amounts of $Fe_2O_3$ amount to 150 ppm and especially 200 ppm. The upper limit of the $Fe_2O_3$ amount is determined by the desired adjustment of the UV absorption edge or limit and thus the UV absorption behavior. However suitable appropriate upper limits of at most 1500 ppm and especially 1200 ppm have proven to be appropriate. An upper limit of 1000 ppm has proven to be especially suitable. Upper limits of 800 ppm and especially 500 ppm have proven to be entirely suitable. In many cases a maximum content of 400 ppm is sufficient. According to the invention it has been shown that the UV absorption edge or limit is shiftable by about 2 to 8 nm to 6 nm to higher wavelengths by addition of about 100 ppm of $Fe_2O_3$.

In the case in which $Fe_2O_3$ is present it has been shown that a minimum amount of $TiO_2$ of 0.5 percent by weight and especially of 0.7 and/or 0.8 percent by weight are sufficient. The upper limit for the $Fe_2O_3$ present amounts to 4.5 percent by weight, especially 4 percent by weight, but 3.5 percent by weight is preferred. In many cases an upper limit of 3 percent by weight, especially of 2.8 percent by weight and even of 2.5 percent by weight, has proven completely satisfactory.

The base glass according to the invention contains at least 55 percent by weight of $SiO_2$. At least 58% by weight of $SiO_2$ and especially at least 60% by weight $SiO_2$ are especially preferred. The preferred minimum amount of $SiO_2$ is 62% by weight. The maximum amount of $SiO_2$ amounts to 79% by weight, especially 75% by weight. An amount of 73% by weight and especially 69% by weight of $SiO_2$ is a most preferred upper limit. The amount of $B_2O_3$ in the glass according to the invention amounts to at least 3% by weight, especially at least 6 percent by weight. Minimum amounts of 10%, especially 15 and/or 18% by weight, are especially preferred. The maximum content of $B_2O_3$ amounts to about 25, preferably 22, percent by weight in the glass according to the invention but a maximum of 20 percent by weight is especially preferred.

$Al_2O_3$ is contained in the glass according to the invention in an amount of 0 to 10 percent by weight. However a minimum amount of 0.5% by weight and/or 1% by weight and especially 2% by weight is preferred. A maximum amount or upper limit of 5 percent by weight, preferably 3 percent by weight, is preferred. The individual alkali metal oxides $Li_2O$, $Na_2O$ and $K_2O$, independently of each other, are present in amounts of from 0 to 10% by weight. A minimum amount of 0.1% by weight, especially 0.2% by weight is preferred. The maximum amount of the individual alkali oxides preferably amounts to 8% by weight. Preferably $Li_2O$ is present in an amount of 0.2 to 1% by weight, $Na_2O$ in an amount of 0.2 to 1.5% by weight and 6 to 8% by weight for $K_2O$. The sum of the amounts of alkali oxides in the base glass according to the invention is 0.5 to 16% by weight, preferably 1 to 16% by weight. The alkaline earth oxides of Mg, Ca, Sr, Ba and the oxide of the transition element Zn are each present in an amount of 0 to 3% by weight, and preferably 0 to % 2% by weight. The sum of the amounts of these alkaline earth oxides and of ZnO according to the invention is 0 to 10 percent by weight. Moreover the base glass according to the invention preferably contains from 0 to 3% by weight $ZrO_2$, from 0 to 1 percent by weight of $CeO_2$ and from 0 to 1% by weight of $Fe_2O_3$. Furthermore $WO_3$, $Bi_2O_3$ and $MoO_3$ are each present independently of each other in an amount of 0 to 3% by weight, preferably 0.1 to 3% by weight.

It has been shown that, although the glass according to the invention is very stable against solarization with UV radiation, its solarization stability can be further increased by small amounts of PdO, $PtO_3$, $PtO_2$, PtO, $RhO_2$, $Rh_2O_3$, $IrO_2$ and/or $Ir_2O_3$. The sum content of the above-described oxides have a maximum value of 0.1 percent by weight, preferably 0.01 percent by weight, especially preferably 0.001 percent by weight. The minimum content for this purpose usually amounts to 0.01 ppm, wherein at least 0.05 ppm and especially at least 0.1 ppm are preferred.

Although the glass according to the invention can contain small amounts of $CeO_2$, PbO and $Sb_2O_3$ to increase chemical resistance and processability, the glass according to the invention is preferably free of these ingredients. In so far as it contains iron, it is converted during the melting to its +3 oxidation state during oxidizing conditions and thus causes no discoloration in the visible wavelength range.

Although nitrate is added to the glass according to the invention in the melt, preferably in the form of alkali- and/or alkaline earth nitrates and as needed zinc nitrates, the $NO_3^-$ concentration in the finished glass after refining amount to only a maximum of 0.01 percent by weight and in many cases at most 0.001 percent by weight.

The UV-radiation absorbing glasses according to the invention, for example, have the following composition:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-10% by weight |
| $K_2O$ | 0-10% by weight, |
| Wherein Σ $Li_2O$ + $Na_2O$ + $K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| Wherein Σ MgO + CaO + SrO + BaO + ZnO | 0-10% by weight, |
| $ZrO_2$ | 0-3% by weight |
| $CeO_2$ | 0-1% by weight |
| $Fe_2O_3$ | 0-1% by weight |
| $WO_3$ | 0-3% by weight |
| $Bi_2O_3$ | 0-3% by weight |
| $MoO_3$ | 0-3% by weight | as well as residual amount of Nitrate, which is under 0.01 Mol %.

Additional preferred UV-radiation absorbing glasses have the following composition:

| | |
|---|---|
| $SiO_2$ | 55-79% by weight |
| $B_2O_3$ | 10-25% by weight |
| $Al_2O_3$ | 0.5-10% by weight |
| $Li_2O$ | 0-10% by weight |
| $Na_2O$ | 0-10% by weight |
| $K_2O$ | 0-10% by weight, |

-continued

| | |
|---|---|
| Wherein Σ $Li_2O$ + $Na_2O$ + $K_2O$ | 1-16% by weight, |
| MgO | 0-2% by weight |
| CaO | 0-3% by weight |
| SrO | 0-3% by weight |
| BaO | 0-3% by weight |
| ZnO | 0-3% by weight, |
| Wherein Σ MgO + CaO + SrO + BaO + ZnO | 0-10% by weight, |
| $ZrO_2$ | 0-3% by weight |
| $CeO_2$ | 0-1% by weight |
| $Fe_2O_3$ | 0-1% by weight |
| $TiO_2$ | 0.1-10% by weight |
| $As_2O_3$ | 0.01-1% by weight; | and with residual nitrate.

However glasses with the following glass composition are also preferred:

| | |
|---|---|
| $SiO_2$ | 62-69% by weight |
| $B_2O_3$ | 18-20% by weight |
| $Al_2O_3$ | 2-3% by weight |
| $Li_2O$ | 0.2-1% by weight |
| $Na_2O$ | 0.2-1.5% by weight |
| $K_2O$ | 6-8% by weight, |
| ZnO | 0.2-1% by weight |
| $TiO_2$ | 0.1-10% by weight |
| $As_2O_3$ | 0.01-1% by weight | and with residual nitrate.

Additional preferred embodiments of the glasses of the invention have the following composition:

| | |
|---|---|
| $SiO_2$ | 69-75% by weight |
| $B_2O_3$ | 15-18% by weight |
| $Al_2O_3$ | 0.5-2% by weight |
| $Li_2O$ | 0-0.5% by weight |
| $Na_2O$ | 3-5% by weight |
| $K_2O$ | 0.5-3% by weight, |
| ZnO | 0-1% by weight |
| $TiO_2$ | 0.1-10% by weight |
| $As_2O_3$ | 0.01-1% by weight | and with residual nitrate.

All the aforementioned exemplary compositions preferably contain the above-described amount of $Fe_2O_3$ and most preferably are substantially free of FeO.

The present invention also relates to a method of making a UV-absorbing glass with reduced absorption in the visible range. A melt is made from the raw material and/or waste or old glasses, which has a composition as defined in the claims below. The method of the invention is characterized by not requiring high purity raw materials, especially high-purity $SiO_2$-raw material. The $SiO_2$ materials, which are required in the method of the invention, can have a content of greater than 100 ppm of $Fe_2O_3$ and/or greater than 500 ppm, especially >600 ppm. These raw materials are chiefly used with an iron oxide content of greater than 120 ppm and/or 130 ppm. However amounts above 150 ppm or also 200 ppm can also be used in the method according to the invention. In many cases even $SiO_2$ base materials with an $Fe_2O_3$ content of greater than 800 ppm, especially of >1000 ppm to greater than 12000 ppm, have proven suitable. Since iron-free base materials lead to larger costs than otherwise during glass manufacture, the procedure according to the invention have not only a surprising technical effect, but also permit an especially economical manufacture of the glass.

It has been shown that an especially sharp UV-absorption edge can be adjusted by means of the method according to the invention and with the glass according to the invention. UV blocking of up to 260 nm, especially up to 270 nm and particularly up to 300 nm, can be attained without difficulty. In an especially preferred embodiment the glass according to the invention blocks UV radiation up to 320 nm and especially up to 335 nm. UV-absorption limits can be attained without or with minimal impairment of the absorption in the visible wavelength range by addition of $TiO_2$ by refining with $As_2O_3$ and $TiO_2$ according to the invention.

The glass according to the invention is especially suitable for making plate glass. The making of glass tubes by the procedure according to the invention is especially preferred. It is especially suitable to make tubes with a diameter of at least 0.5 mm, especially at least 1 mm and an upper limit of at most 2 cm, especially at most 1 cm. Especially a tube diameter of between 2 mm and 5 mm is preferred. It has proven suitable that the tubes according to the invention have a diameter of at least 0.05 mm, especially at least 0.1 mm. A diameter of at least 0.2 mm is particularly preferred. A maximum wall thickness of the tube wall amounts to at most 1 mm, wherein a wall thickness of <0.8 mm and/or <0.7 mm is especially preferred.

The glass according to the invention is especially suitable for use in gas discharge tubes and fluorescent lamps, and is most suitable for lighting units, especially background lighting of electronic display apparatus, such as displays and LCD screens, for example in mobile telephones and computer monitors. Preferred displays and screens are named flat displays, especially flat backlighting arrangements. Halogen-free light sources, for example those, which are based on discharge in noble gasses, such as argon, neon, xenon or mixture (Xenon lamps), are particularly preferred. Also Hg-containing filling gases are understandably suitable. These embodiments have proven especially environmentally friendly.

The glasses according to the invention are especially useful for fluorescence lamps with external electrodes and also for fluorescence lamps, in which the electrodes are sealed with the lamp glass and can pass through them, such as those made of KOVAR® alloys. External electrodes can, for example, be formed by an electrically conductive paste.

BRIEF DESCRIPTION OF THE SEVERAL VIEWS OF THE DRAWING

The objects, features and advantages of the invention will now be illustrated in more detail with the aid of the following description of the preferred embodiments, with reference to the accompanying figures in which:

FIG. 6b is a cross-sectional view through a miniaturized backlighting device using the reflective base plate or support plate according to FIG. 6a;

DESCRIPTION OF PREFERRED EMBODIMENTS OF THE INVENTION

Figure 6A:
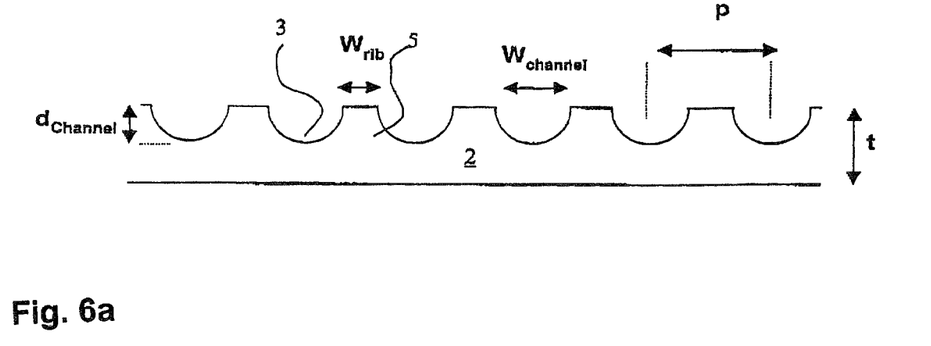
FIG. 6a is a diagrammatic cross-sectional view through a reflective base plate or support plate for a miniaturized backlighting arrangement.
Figure 6B:
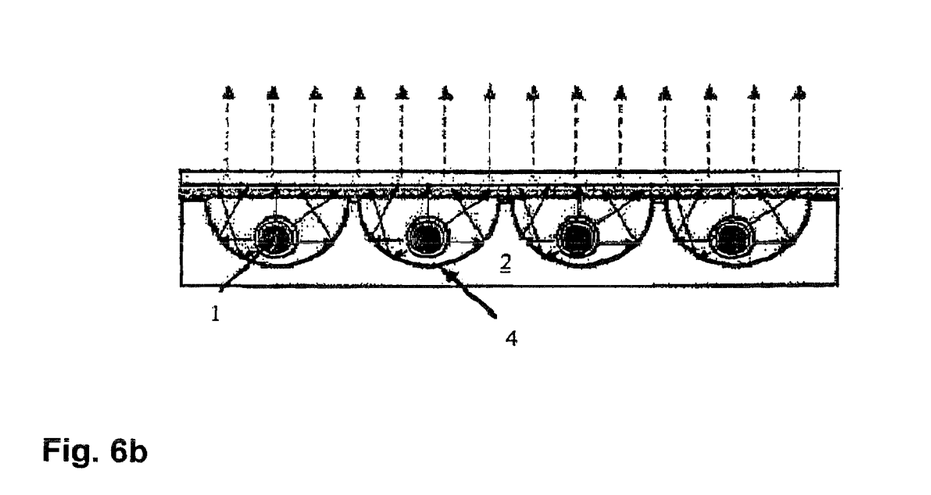

In a special embodiment, as shown for example in FIGS. 6a & 6b, the glass is used for making a low-pressure discharge lamp, especially for a backlighting arrangement. A special use is for those applications, in which individual miniaturized tubular light sources 1 are arranged parallel to each other and in recesses 3 in a plate 2, which reflects the generated light on the display. A layer 4, which scatters light uniformly and thus uniformly illuminates the display, is applied on the upper surface of the reflecting plate 2. This arrangement is provided for larger displays, for example those used for television.

Figure 7:
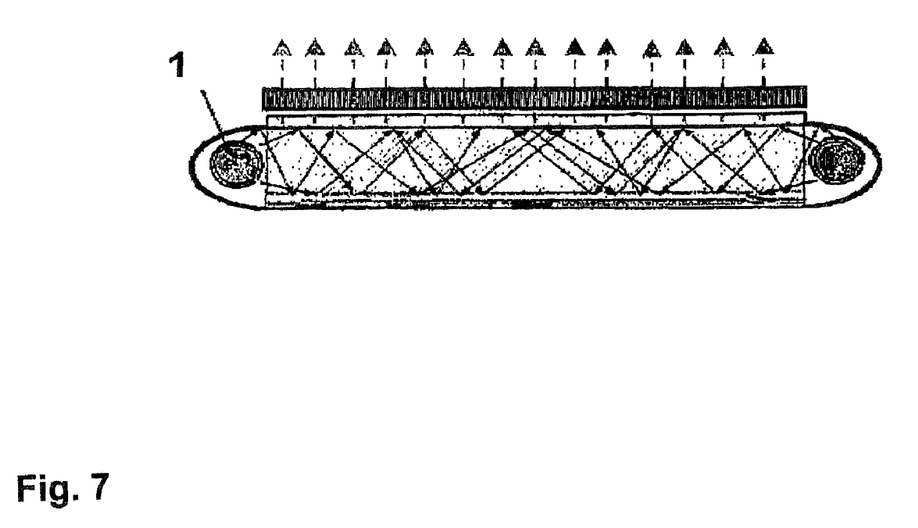
FIG. 7 is a cross-sectional view through a display device and/or backlighting device with backside illumination by laterally arranged fluorescent lights.

Furthermore the tubular light sources 1, as shown in FIG. 7, can be mounted outside of the display. Then the light is scattered uniformly over the display by means of a plate conducting light and serving as a light guide, as a so-called LGP (light guide plate). In both cases the tubular light sources can have external or internal electrodes.

Figure 8:
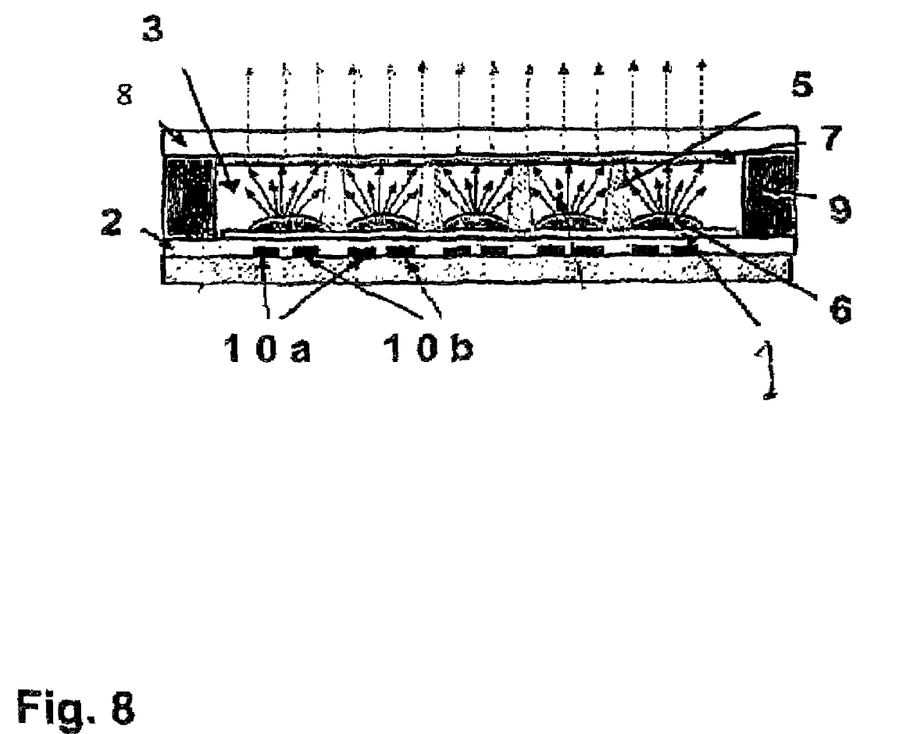
FIG. 8 is a cross-sectional view through a miniaturized display apparatus and/or backlight display with an integrated fluorescent channel.

As shown in FIG. 8, it is also possible to use this arrangement for a backlight device, in which the light-producing means 1 is located in a structured panel, plate or pane 2. The structuring thus takes place so that channels 3 with predetermined depth and predetermined width ($d_{channel}$ and/or $W_{channel}$) are produced in the pane 2 by means of parallel raised or elevated sections, so-called barriers 5 with a predetermined width ($W_{rib}$) in the panel, plate or pane. Discharge light sources 6 are arranged in the channels. The channels 3 together with another pane 8 provided with a phosphor layer 7 form the radiating chamber. The panes themselves are sealed laterally with a seal 9 and provided with electrodes passing through them. In the case of one such embodiment it can be referred to as a so-called CCFL system (cold cathode fluorescent lamp). However in principle an exterior electrical connection is also possible, i.e. ignition of the plasma by means of an exterior electrical field (EEFL external electrode fluorescent lamp), which is possible by means of electrodes like electrodes 10a, 10b. This arrangement forms a large-area backlight and is also called a flat backlight. The panes of the flat backlight and/or the cover plate are structured according to their application or use. Both together with each other form the radiating chamber. A blank, which is obtained by rolling with a suitable structuring device, for example is pressed or stamped with a suitably structured roller, is used for making this type of structured pane, plate or panel. Furthermore the glass is heated to a temperature, at which its viscosity is suitable for this purpose, which is between the softening point and the working point of the glass. The structured pane has structures with structure depths and widths of a few tenths of millimeters (e.g. 0.1 usually 0.3 mm) to a few millimeters (e.g. 1 to 8 mm). This sort of structuring can occur by other methods of manufacture, for example, stamping, etching, machining, chemical etching or laser ablation. The desired structures can also be obtained directly from the melt by certain hot molding or forming processes.

The invention is illustrated in more detail by the following examples.

EXAMPLES

The raw materials for the glasses A1 to A14 according to the invention and the comparative glasses V1 to V6 of the prior art, whose compositions are listed in Tables I to Va and Vb, were melted. The raw materials were melted in a quartz glass vessel at a temperature of 1620° C. and refined. The absorption and/or transmission of the resulting glasses were measured.

Figure 1:
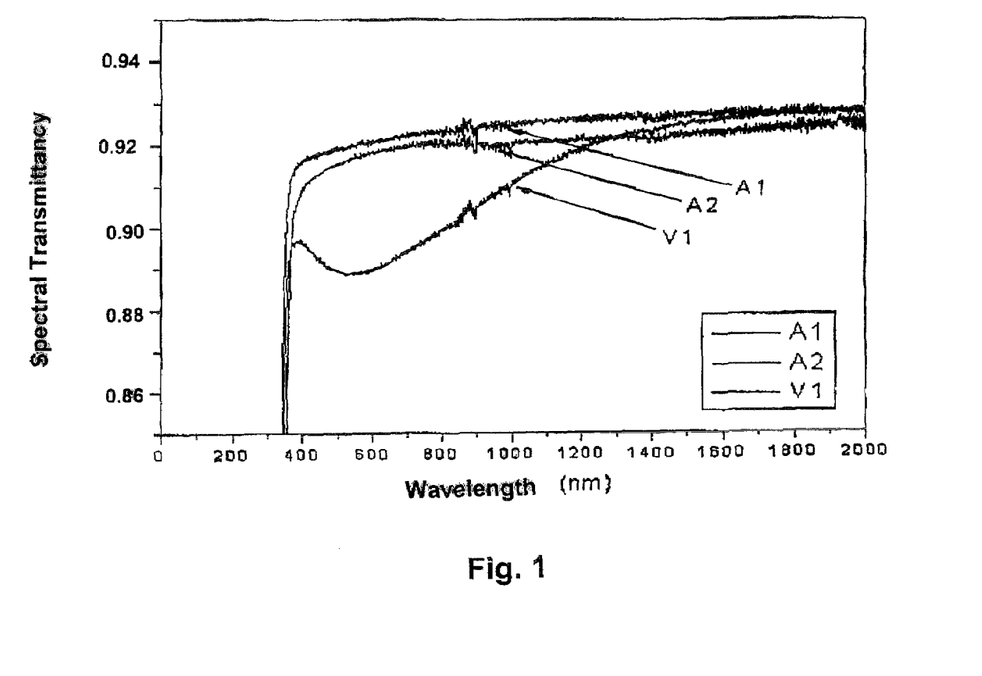
FIG. 1 is a graphical illustration showing the variation of transmission with wavelength for examples of glasses of the invention and of the prior art.
Figure 2:
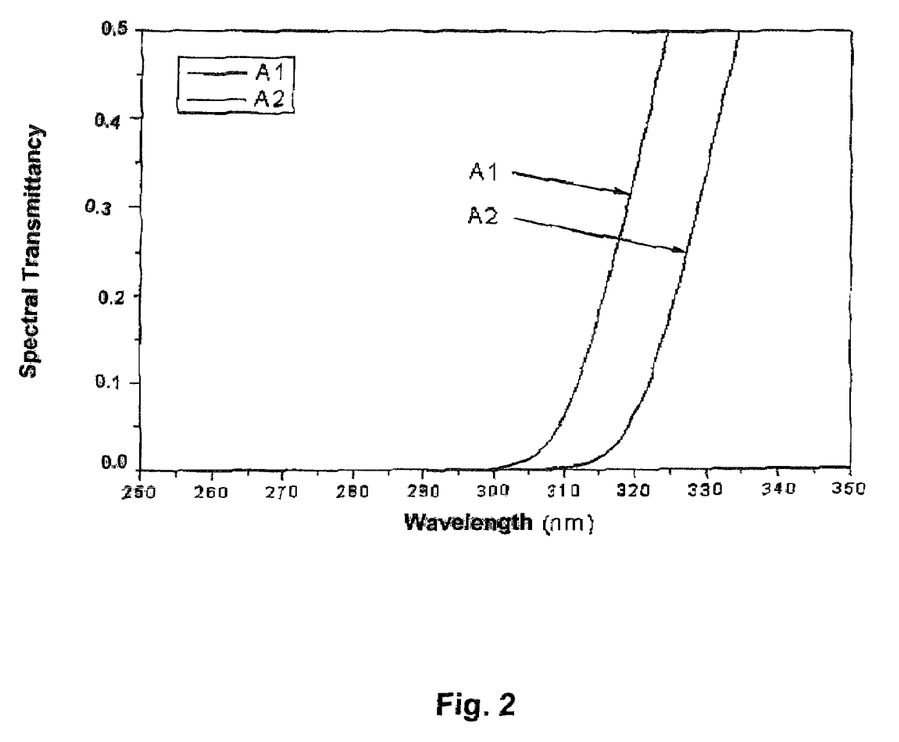
FIG. 2 is a detailed graphical illustration showing the steep increase in transmission at the UV-absorption limit or edge for exemplary glasses according to the invention.
Figure 3:
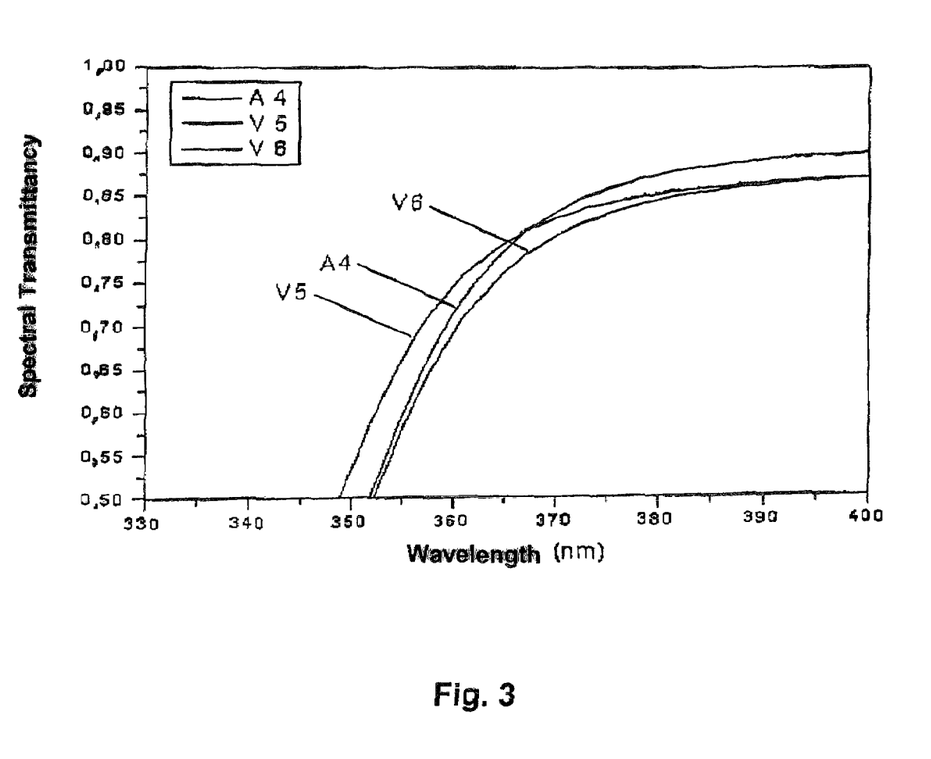
FIG. 3 is a detailed graphical illustration comparing the UV-absorption edge for an exemplary glass according to the invention with that of examples of prior art glasses.
Figure 4:
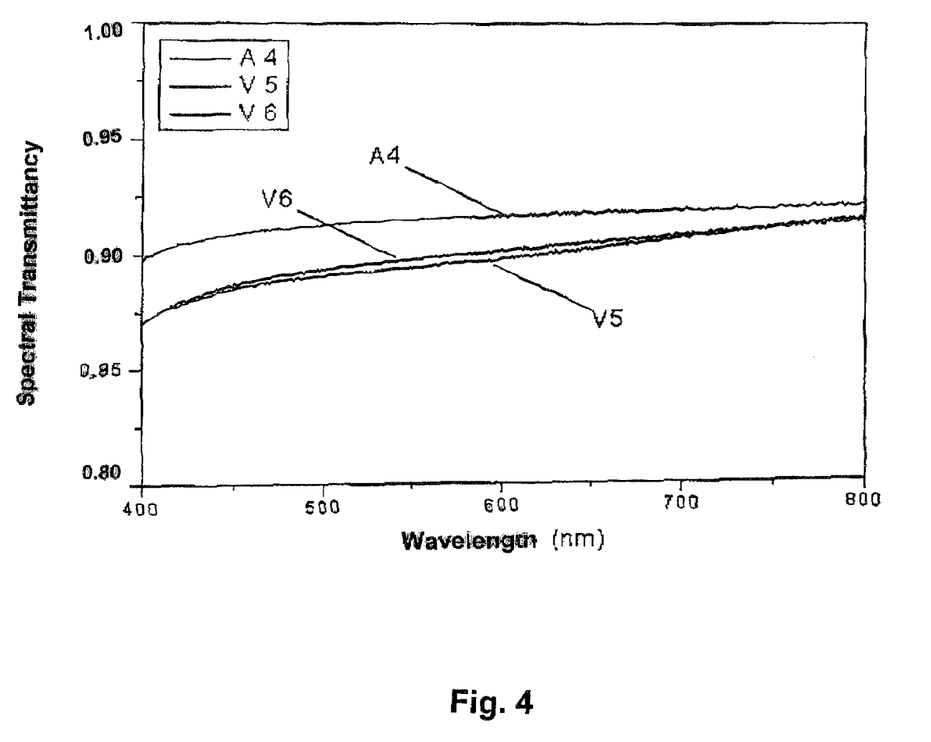
FIG. 4 is a detailed graphical illustration comparing the transmission behavior of an exemplary glass according to the invention with that of glasses of the prior art.

The transmission results are shown in FIGS. 1 to 5. FIG. 1 shows that glass A1 and A2 according to the invention have about the same transmission behavior, which is compared with the transmission behavior of an example of the glass V1 according to the state of the art. As should be readily apparent, the transmission in the visible range is largely constant until about 400 nm in the case of the glasses according to the invention and then sharply decreases at about 315 nm. The glasses according to the invention thus have a sharp UV-absorption edge, while in contrast the glass V1 has a strong decrease in its transmittancy in the visible range that starts around 1300 to 1400 nm. FIG. 2 shows the sharp increase of the UV-absorption edge or limit by increasing the $TiO_2$ content. FIG. 3 shows the steep UV-absorption edge in the glass A4 according to the invention in comparison to glasses of the state of the art V5 and V6. FIG. 4 shows the good transmission properties of the glasses according to the invention in the range between 400 nm and 800 nm.

TABLE I

GLASS COMPOSITIONS OF THE INVENTION

| Oxide Ingredients | A1, % | A2, % | A3, % |
|---|---|---|---|
| $SiO_2$ | 65.13 | 64.13 | 63.13 |
| $B_2O_3$ | 19.00 | 19.00 | 19.00 |
| $Al_2O_3$ | 2.65 | 2.65 | 2.65 |
| ZnO | 0.60 | 0.60 | 0.60 |
| $TiO_2$ | 3.50 | 4.50 | 5.50 |
| $As_2O_3$ | 0.10 | 0.10 | 0.10 |
| $Sb_2O_3$ | — | — | — |
| $Na_2CO_3$*[1] | — | — | — |
| $Na_2NO_3$*[2] | 0.72 | 0.72 | 0.72 |
| $Li_2CO_3$*[3] | — | — | — |
| $LiNO_3$*[4] | 0.65 | 0.65 | 0.65 |
| NaCl*[5] | — | — | — |
| $Na_2SO_4$*[6] | — | — | — |
| $K_2CO_3$*[7] | 7.65 | 7.65 | 7.65 |
| KCl*[8] | — | — | — | amounts of:
*[1]$Na_2O$ added as $Na_2CO_3$;
*[2]$Na_2O$ added as $NaNO_3$;
*[3]$Li_2O$ added as $LiCO_3$;
*[4]$Li_2O$ added as $LiNO_3$;
*[5]$Na_2O$ added as NaCl;
*[6]$Na_2O$ added as $NaSO_4$;
*[7]$K_2O$ added as $K_2CO_3$;
*[8]$K_2O$ added as KCl

TABLE II

GLASS COMPOSITIONS OF THE PRIOR ART

| Oxide Ingredients | V1, % | V2, % | V3, % | V4, % |
|---|---|---|---|---|
| $SiO_2$ | 65.23 | 65.23 | 64.63 | 63.73 |
| $B_2O_3$ | 19.00 | 19.00 | 19.00 | 19.00 |
| $Al_2O_3$ | 2.65 | 2.65 | 2.65 | 2.65 |
| ZnO | 0.60 | 0.60 | 0.60 | 0.60 |
| $TiO_2$ | 3.50 | 3.50 | 4.00 | 5.00 |
| $As_2O_3$ | — | — | — | — |
| $Sb_2O_3$ | — | — | 0.10 | — |
| $Na_2CO_3$*[1] | — | — | — | — |
| $Na_2NO_3$*[2] | 0.72 | — | 0.72 | — |
| $Li_2CO_3$*[3] | — | — | — | — |
| $LiNO_3$*[4] | 0.65 | 0.65 | 0.65 | 0.65 |
| NaCl*[5] | — | 0.72 | — | — |
| $Na_2SO_4$*[6] | — | — | — | 0.72 |
| $K_2CO_3$*[7] | 6.45 | 7.65 | 7.65 | 7.65 |
| KCl*[8] | 1.20 | — | — | — | amounts of:
*[1]$Na_2O$ added as $Na_2CO_3$;
*[2]$Na_2O$ added as $NaNO_3$;
*[3]$Li_2O$ added as $LiCO_3$;
*[4]$Li_2O$ added as $LiNO_3$;
*[5]$Na_2O$ added as NaCl;
*[6]$Na_2O$ added as $NaSO_4$;
*[7]$K_2O$ added as $K_2CO_3$;
*[8]$K_2O$ added as KCl

TABLE III

GLASS COMPOSITIONS OF THE PRIOR ART AND INVENTION

Figure 5:
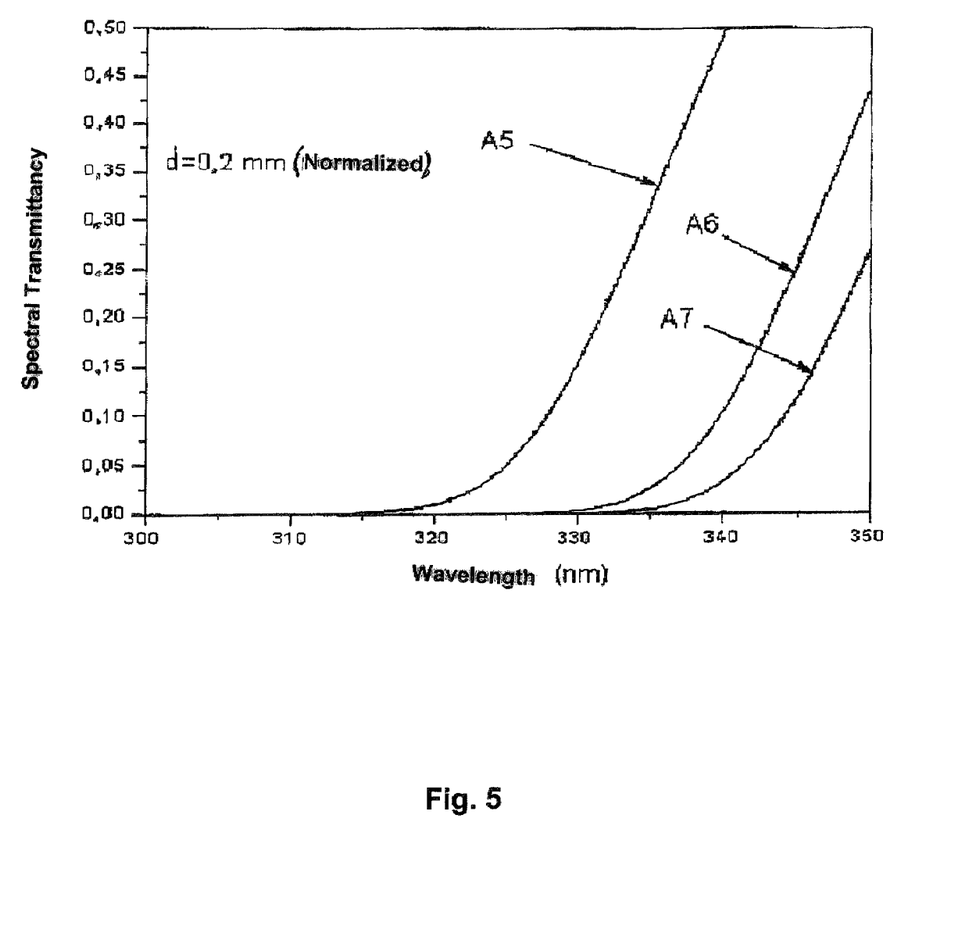
FIG. 5 is a detailed graphical illustration showing how the UV-absorption edge is adjusted for exemplary glasses according to the invention by changing the titanium content of the glasses.

| Oxide Ingredients | A4, % | V5, % | V6, % |
|---|---|---|---|
| $SiO_2$ | 63.63 | 63.73 | 63.73 |
| $B_2O_3$ | 19.00 | 19.00 | 19.00 |
| $Al_2O_3$ | 2.65 | 2.65 | 2.65 |
| ZnO | 0.60 | 0.60 | 0.60 |
| $TiO_2$ | 5.00 | 5.00 | 5.00 |
| $As_2O_3$ | 0.10 | — | — |
| $Sb_2O_3$ | — | — | — |
| $Na_2CO_3$*[1] | — | — | 0.72 |
| $Na_2NO_3$*[2] | 0.72 | — | — |
| $Li_2CO_3$*[3] | — | — | 0.65 |
| $LiNO_3$*[4] | 0.65 | 0.65 | — |
| NaCl*[5] | — | — | — |
| $Na_2SO_4$*[6] | — | 0.72 | — |
| $K_2CO_3$*[7] | 7.65 | 7.65 | 7.65 |
| KCl*[8] | — | — | — | amounts of:
*[1]$Na_2O$ added as $Na_2CO_3$;
*[2]$Na_2O$ added as $NaNO_3$;
*[3]$Li_2O$ added as $LiCO_3$;
*[4]$Li_2O$ added as $LiNO_3$;
*[5]$Na_2O$ added as NaCl;
*[6]$Na_2O$ added as $NaSO_4$;
*[7]$K_2O$ added as $K_2CO_3$;
*[8]$K_2O$ added as KCl Analogous to the above-described procedure glasses were melted with the compositions tabulated in Table IV. A 0.2 mm thick sample pane was ground or cut from each of these glasses and its spectral transmission was measured. The UV-absorption edge or limit may be clearly shifted about 20 nm to higher wavelengths by changing the content of $TiO_2$ from 4.5 to 5.5 percent by weight. These results are illustrated in FIG. 5.

TABLE IV

GLASS COMPOSITIONS OF THE INVENTION AND THEIR PROPERTIES

| Oxide Ingredients/Properties | A5, % | A6, % | A7, % |
|---|---|---|---|
| $SiO_2$ | 64.13 | 63.63 | 63.13 |
| $B_2O_3$ | 19.00 | 19.00 | 19.00 |
| $Al_2O_3$ | 2.65 | 2.65 | 2.65 |
| $Na_2O$*2 | 0.72 | 0.72 | 0.72 |
| $K_2O$*9 | 7.65 | 7.65 | 7.65 |
| $Li_2O$ | 0.65 | 0.65 | 0.65 |
| ZnO | 0.60 | 0.60 | 0.60 |
| $As_2O_3$ | 0.10 | 0.10 | 0.10 |
| $TiO_2$ | 4.50 | 5.00 | 5.50 |
| Total | 100.00 | 100.00 | 100.00 |
| ALPHA × $10^6$ in $K^{-1}$ (20-300° C.) | 4.84 | | |
| TG, ° C. | 487 | | |
| VA, ° C. | 1031 | | |
| Seal Ex. Glass/glass in 8250 Standard | −72 | | |
| Seal Ex. Glass/metal Vacon 11 | −20 | | |
| Transmission Edge T < 0.1% (layer thickness, 0.2 mm) | 315 nm | 329 nm | 333 nm |
| Transmission at 318 nm, % (layer thickness, 0.2 mm) | 0.41% | — | — | amounts of:
*2$Na_2O$ added as $NaNO_3$;
*9 2% $K_2O$ added as $KNO_3$, remainder $K_2CO_3$ TABLE Va

GLASS COMPOSITIONS OF THE INVENTION AND THEIR PROPERTIES AND RAW MATERIALS

| Oxide Ingredients/Properties | Raw Material | A8, % | A9, % | A10, % | A11, % |
|---|---|---|---|---|---|
| $SiO_2$ | $SiO_2$ | 71.50 | 69.00 | 71.65 | 71.20 |
| $B_2O_3$ | $H_3BO_3$ | 17.00 | 18.00 | 16.90 | 16.90 |
| $Al_2O_3$ | $Al_2O_3$ | 1.00 | 1.50 | 1.15 | 1.15 |
| $Na_2O$ | $NaCO_3$ | 1.90 | 1.00 | 1.75 | 1.75 |
| $Na_2O$ | $NaNO_3$ | 2.00 | 3.00 | 2.00 | 2.00 |
| $K_2O$ | $K_2CO_3$ | 2.00 | 2.00 | 1.45 | 1.45 |
| CaO | $CaCO_3$ | 0.60 | 0.80 | 0.60 | 0.60 |
| MgO | $MgCO_3$ | 0.40 | 0.60 | 0.40 | 0.40 |
| $TiO_2$ | $TiO_2$ | 3.50 | 4.00 | 4.00 | 4.50 |
| $As_2O_3$ | | 0.10 | 0.10 | 0.10 | 0.05 |
| Total | | 100.00 | 100.00 | 100.00 | 100.00 |
| ALPHA × $10^6$ in $K^{-1}$ (20-300° C.) | | | | 3.9 | |
| TG, ° C. | | | | 500 | |
| VA, ° C. | | | | | |
| Transmission Edge T < 0.1% (layer thickness, 0.2 mm) | | | | 310 nm | 315 nm |

TABLE Vb

GLASS COMPOSITIONS OF THE INVENTION AND THEIR PROPERTIES AND RAW MATERIALS

| Oxide Ingredients/Properties | Raw Material | A12, % | A13, % | A14, % |
|---|---|---|---|---|
| $SiO_2$ | $SiO_2$ | 64.15 | 64.15 | 63.65 |
| $B_2O_3$ | $H_3BO_3$ | 19.00 | 19.00 | 19.00 |
| $Al_2O_3$ | $Al_2O_3$ | 2.65 | 2.65 | 2.65 |
| $Na_2O$ | $NaCO_3$ | 0.70 | 0.70 | 0.70 |
| $K_2O$ | $K_2CO_3$ | 5.65 | 5.65 | 5.65 |
| $K_2O$ | $KNO_3$ | 2.00 | 2.00 | 2.00 |
| $Li_2O$ | $Li_2CO_3$ | 0.65 | 0.65 | 0.65 |
| ZnO | ZnO | 0.60 | 0.60 | 0.40 |
| $As_2O_3$ | $As_2O_3$ | 0.10 | 0.10 | 0.10 |
| $TiO_2$ | $TiO_2$ | 4.50 | 4.50 | 5.00 |
| $Fe_2O_3$ | | 15 ppm | 110 ppm | 15 ppm |
| Total | | 100.00 | 100.00 | 100.00 |
| Max. Wavelength (nm) with T < 0.1% | | 310 nm | 315 nm | 315 nm |

A comparison of the Table Va and Vb shows how the UV-absorption limit can be adjusted by means of the iron content (especially by using different $SiO_2$ raw materials with different iron content). According to the invention it is thus unimportant, whether or not the iron is contained in a large amount as an impurity in the raw material or is added as an extra ingredient. An iron content of greater than 100 ppm is especially preferred in production, since the material costs can be reduced because of that, because up to now iron-poor $SiO_2$ raw materials are very expensive.

Unless otherwise stated, all percentages are percentages by weight.

The disclosure in German Patent Application 103 25 744.6 of Jun. 6, 2003 is incorporated here by reference. This German Patent Application describes the invention described hereinabove and claimed in the claims appended hereinbelow and provides the basis for a claim of priority for the instant invention under 35 U.S.C. 119.

While the invention has been illustrated and described as embodied in a UV-radiation absorbing glass with reduced absorption of visible light and methods of making and using same, it is not intended to be limited to the details shown, since various modifications and changes may be made without departing in any way from the spirit of the present invention.

Without further analysis, the foregoing will so fully reveal the gist of the present invention that others can, by applying current knowledge, readily adapt it for various applications without omitting features that, from the standpoint of prior art, fairly constitute essential characteristics of the generic or specific aspects of this invention.

What is claimed is new and is set forth in the following appended claims.

We claim:

1. A method of making a UV-absorbing glass, which transmits in a visible range, said method comprising melting raw materials to form a melt and producing said melt under oxidative conditions,
wherein said melt is free of PbO and has the following composition:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-5% by weight |

-continued

| | |
|---|---|
| $K_2O$ | 0-10% by weight, |
| Wherein $\Sigma\, Li_2O + Na_2O + K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| Wherein $\Sigma\, MgO + CaO + SrO + BaO + ZnO$ | 0-10% by weight, |
| $ZrO_2$ | 0-3% by weight |
| $CeO_2$ | 0-1% by weight |
| $Fe_2O_3$ | 50 ppm-1% by weight |
| $WO_3$ | 0-3% by weight |
| $Bi_2O_3$ | 0-3% by weight |
| $MoO_3$ | 0-3% by weight |
| $TiO_2$ | 0.5-10% by weight; | so that at least 95% of any titanium in said glass is present as $Ti^{+4}$.

2. The method as defined in claim 1, wherein said melt contains at least 150 ppm of said $Fe_2O_3$.

3. The method as defined in claim 1, wherein said $SiO_2$ and/or said raw materials contain greater than 100 ppm $Fe_2O_3$.

4. The method as defined in claim 1, wherein said oxidative conditions are produced by addition of alkali nitrates and/or alkaline earth nitrates.

5. The method as defined in claim 1, wherein said raw materials contain up to a maximum of 6 percent by weight of alkali nitrates and/or alkaline earth nitrates in order to produce said oxidative conditions.

6. The method as defined in claim 1, wherein said melt contains up to a maximum of 100 ppm chloride.

7. The method as defined in claim 1, wherein said melt contains from 0.01 to 2 percent by weight of $As_2O_3$ as refining agent.

8. A UV-radiation absorbing glass with minimal absorption in the visible range, said UV-radiation absorbing glass being free of PbO and having the following composition:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-5% by weight |
| $K_2O$ | 0-10% by weight, |
| wherein $\Sigma\, Li_2O + Na_2O + K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma\, MgO + CaO + SrO + BaO + ZnO$ | 0-10% by weight, |
| $ZrO_2$ | 0-3% by weight |
| $CeO_2$ | 0-1% by weight |
| $Fe_2O_3$ | 50 pmm-1% by weight |
| $WO_3$ | 0-3% by weight |
| $Bi_2O_3$ | 0-3% by weight |
| $MoO_3$ | 0-3% by weight |
| $TiO_2$ | 0.5-10% by weight; | wherein 95% of any titanium present is in a +4 oxidation state.

9. The method as defined in claim 8, wherein said melt contains at least 150 ppm of said $Fe_2O_3$.

10. The UV-radiation absorbing glass as defined in claim 8, containing from 55 to 79% by weight of said $SiO_2$, from 10 to 25% by weight of said $B_2O_3$, from 0.5 to 10 percent by weight of said $Al_2O_3$ and from 1 to 16% by weight of said $\Sigma Li_2O + Na_2O + K_2O$.

11. The UV-radiation absorbing glass as defined in claim 8, containing from 62 to 69% by weight of said $SiO_2$, from 18 to 20% by weight of said $B_2O_3$, from 2 to 3 percent by weight of said $Al_2O_3$, from 0.2 to 1% by weight of said $Li_2O$, from 0.2 to 1.5% by weight of said $Na_2O$, from 6 to 8% by weight of said $K_2O$, from 0.2 to 1% by weight of said ZnO and from 0.5 to 10 percent by weight of said $TiO_2$.

12. The UV-radiation absorbing glass as defined in claim 8, containing from 69 to 75% by weight of said $SiO_2$, from 15 to 18% by weight of said $B_2O_3$, from 0.5 to 2 percent by weight of said $Al_2O_3$, from 0 to 0.5% by weight of said $Li_2O$, from 3 to 5% by weight of said $Na_2O$, from 0.5 to 3% by weight of said $K_2O$, from 0 to 1% by weight of said ZnO and from 0.5 to 10 percent by weight of said $TiO_2$.

13. The UV-radiation absorbing glass as defined in claim 8, further comprising up to a maximum of 0.01 percent by weight of at least one metal oxide selected from the group consisting of PdO, $PtO_3$, $PtO_2$, PtO, $RhO_2$, $Rh_2O_3$, $IrO_2$ and $Ir_2O_3$.

14. A lighting device comprising UV-absorbing glass, said UV-absorbing glass being free of PbO and having a composition comprising:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-10% by weight |
| $K_2O$ | 0-10% by weight, |
| wherein $\Sigma\, Li_2O + Na_2O + K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma\, MgO + CaO + SrO + BaO + ZnO$ | 0-10% by weight, |
| $ZrO_2$ | 0-3% by weight |
| $CeO_2$ | 0-1% by weight |
| $Fe_2O_3$ | 50 ppm-1% by weight |
| $WO_3$ | 0-3% by weight |
| $Bi_2O_3$ | 0-3% by weight |
| $MoO_3$ | 0-3% by weight |
| $TiO_2$ | 0.5-10% by weight; | wherein 95% of any titanium present is in a +4 oxidation state.

15. The lighting device as defined in claim 14, consisting of a gas discharge lamp, fluorescence lamp or a Xenon lamp.

16. A display device comprising UV-absorbing glass, said UV-absorbing glass being free of PbO and having a composition comprising:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-10% by weight |
| $K_2O$ | 0-10% by weight, |
| wherein $\Sigma\, Li_2O + Na_2O + K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma\, MgO + CaO + SrO + BaO + ZnO$ | 0-10% by weight, |

-continued

| | |
|---|---|
| $ZrO_2$ | 0-3% by weight |
| $CeO_2$ | 0-1% by weight |
| $Fe_2O_3$ | 50 ppm-1% by weight |
| $WO_3$ | 0-3% by weight |
| $Bi_2O_3$ | 0-3% by weight |
| $MoO_3$ | 0-3% by weight |
| $TiO_2$ | 0.5-10% by weight; | wherein 95% of any titanium present is in a +4 oxidation state.

17. The display device as defined in claim 16, consisting of a computer monitor, a telephone display or a liquid crystal display.

18. A glass-to-metal seal comprising a UV-absorbing glass and at least one metal component made of at least one metal, said at least one metal being selected from the group consisting of molybdenum, tungsten and iron-cobalt-nickel alloys, and wherein said UV-absorbing glass is free of PbO and has a composition comprising:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-10% by weight |
| $K_2O$ | 0-10% by weight, |
| wherein $\Sigma$ $Li_2O$ + $Na_2O$ + $K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma$ MgO + CaO + SrO + BaO + ZnO | 0-10% by weight, |
| $ZrO_2$ | 0-3% by weight |
| $CeO_2$ | 0-1% by weight |
| $Fe_2O_3$ | 50 ppm-1% by weight |
| $WO_3$ | 0-3% by weight |
| $Bi_2O_3$ | 0-3% by weight |
| $MoO_3$ | 0-3% by weight |
| $TiO_2$ | 0.5-10% by weight; | wherein 95% of any titanium present is in a +4 oxidation state.

19. A UV-radiation absorbing glass with minimal absorption in the visible range and with a composition consisting of:

| | |
|---|---|
| $SiO_2$ | 55-79% by weight |
| $B_2O_3$ | 3-25% by weight |
| $Al_2O_3$ | 0-10% by weight |
| $Li_2O$ | 0-10% by weight |
| $Na_2O$ | 0-5% by weight |
| $K_2O$ | 0-10% by weight, |
| wherein $\Sigma$ $Li_2O$ + $Na_2O$ + $K_2O$ | 0.5-16% by weight, |
| MgO | 0-2% by weight |
| CaO | 0-3% by weight |
| SrO | 0-3% by weight |
| BaO | 0-3% by weight |
| ZnO | 0-3% by weight, |
| wherein $\Sigma$ MgO + CaO + SrO + BaO + ZnO | 0-10% by weight, |
| $ZrO_2$ | 0-3% by weight |
| $CeO_2$ | 0-1% by weight |
| $WO_3$ | 0-3% by weight |
| $Bi_2O_3$ | 0-3% by weight |
| $MoO_3$ | 0-3% by weight |
| $TiO_2$ | 0.5-10% by weight |
| $Fe_2O_3$ | 50 ppm to 1500 ppm |
| at least one metal oxide selected from the group consisting of PdO, $PtO_3$, $PtO_2$, PtO, $RhO_2$, $Rh_2O_3$, $IrO_2$ and $Ir_2O_3$ | 0.1 ppm to 0.1% by weight; | wherein 95% of any titanium present is in a +4 oxidation state.

20. The UV-radiation absorbing glass as defined in claim 19, wherein said $Fe_2O_3$ is present in an amount of 150 ppm to 1500 ppm and said $TiO_2$ is present in an amount of from 2-10 percent by weight.

* * * * *